(12) United States Patent
Schlierf et al.

(10) Patent No.: US 7,111,901 B2
(45) Date of Patent: Sep. 26, 2006

(54) HEADREST FOR AUTOMOTIVE VEHICLE SEATS

(75) Inventors: Manfred Schlierf, Kümmersbruck (DE); Josef Meier, Freudenberg (DE); Thomas Wallinger, Bodenwöhr (DE)

(73) Assignee: Grammar AG, Amberg (DE)

( * ) Notice: Subject to any disclaimer, the term of this patent is extended or adjusted under 35 U.S.C. 154(b) by 0 days.

(21) Appl. No.: 10/996,336

(22) Filed: Nov. 23, 2004

(65) Prior Publication Data

US 2005/0116515 A1 Jun. 2, 2005

(30) Foreign Application Priority Data

Nov. 26, 2003 (DE) ................................. 103 55 773

(51) Int. Cl.
*B60N 2/42* (2006.01)
(52) U.S. Cl. ................................. 297/216.12; 297/391
(58) Field of Classification Search ............ 297/216.12, 297/391, 406, 407, 408, 409
See application file for complete search history.

(56) References Cited

U.S. PATENT DOCUMENTS

| | | | |
|---|---|---|---|
| 2,973,029 A | | 2/1961 | Schlosstein |
| 4,278,291 A | | 7/1981 | Asai |
| 5,826,937 A | * | 10/1998 | Massara ................... 297/284.6 |
| 6,213,548 B1 | * | 4/2001 | Van Wynsberghe et al. ..... 297/216.12 |
| 6,474,733 B1 | * | 11/2002 | Heilig et al. ............ 297/216.12 |
| 6,623,073 B1 | * | 9/2003 | Schafer et al. .......... 297/216.12 |
| 6,666,516 B1 | * | 12/2003 | Grammss et al. ........... 297/407 |

FOREIGN PATENT DOCUMENTS

| | | |
|---|---|---|
| DE | 200 21 127 | 5/2001 |
| DE | 101 38 248 | 12/2002 |
| EP | 0 974 484 | 1/2000 |

* cited by examiner

*Primary Examiner*—Peter M. Cuomo
*Assistant Examiner*—Sarah B. McPartlin
(74) *Attorney, Agent, or Firm*—Andrew Wilford

(57) ABSTRACT

A headrest for a motor vehicle seat is crash active in that it has a mechanism for automatically bringing the head-engaging member toward the head of the passenger in the case of a crash. This mechanism includes a slide guided on a pair of cylindrical members surrounded by springs and having a tooth-forming part of a return travel lock preventing return of the slide to its starting position. In that position a releasable coupling device has a primary coupling element engaged with a secondary coupling element which may be a hairpin-shaped bent wire.

22 Claims, 8 Drawing Sheets

HEADREST FOR AUTOMOTIVE VEHICLE SEATS

FIELD OF THE INVENTION

Our present invention relates to a headrest for motor vehicle seats and, more particularly, to a headrest of the type in which a head-engaging member is moved toward the back of the head of a passenger in the vehicle seat in case of a crash or the like.

BACKGROUND OF THE INVENTION

In EP 0 974 484 B1 a headrest of this type is described. With this kind of headrest there is the advantage that energy stored by mechanical means, for example, in a stressed spring, can be used to move the head-engaging member toward the back of the head of the passenger, thereby avoiding sharp changes in direction of the head by whiplash in the case of an accident.

EP 0 974 484 B1 describes a mechanical force or energy-storing spring system in which the spring is provided between two members telescopingly fitted one into the other and in which an inadvertent inward movement of the head-engaging member is prevented by a lock preventing backward movement of that member. The device preventing the backward movement comprised two levers acting upon the head-engaging member. This system has the advantage of compact and simple construction.

U.S. Pat. No. 2,973,029 describes a headrest whose cushion carrier is affixed to a ram-like support rod. In the case of a load upon the head-engaging member the headrest and this support bar is displaced into a space in the seat back against the force of a coil compression spring. The support bar has a rachet arrangement of teeth engageable by a pawl so that the headrest can be held in its inwardly displaced position.

The device known from this patent cannot be considered to have a crash-active head support.

U.S. Pat. No. 4,278,291 describes a headrest for a vehicle seat with a movable part in the form of a linear lock with a hand-actuatable locking pin or pawl. A coil compression spring biases the head-engaging member continuously outwardly. If the passenger prefers a particular ergonomic head position, he or she must actuate the pawl and the movable part of the head support. This system as well cannot be deemed to be a crash-active headrest, i.e. one which automatically responds to a crash.

DE 101 38 248 C1 describes a crash-active head support in which the outward movement of the head support member is effected by a transmission. The transmission is combined with a linear directional lock functioning as a back-movement preventer.

DE 200 21 127 U1 (compare FIG. 12) describes a headrest in which the spring-supported outward movement is blocked by two racks which are offset from one another.

OBJECTS OF THE INVENTION

It is the principal object of the present invention to so improve the headrest of EP 0 974 484 B1 that a compact crash-active response can be obtained with simple means and that after a crash the unit can be readily and without significant effort restored to its original state.

Another object of the invention is to improve earlier crash-active headrests so that drawbacks thereof are avoided.

SUMMARY OF THE INVENTION

These objects and others which will become apparent hereinafter are attained, in accordance with the invention in a headrest for an automotive vehicle seat which comprises:

a main headrest body adapted to be mounted upon a back of a motor vehicle seat;

a head-engaging member having a surface juxtaposable with a back of a head of a passenger seated in the seat and movable relative to the main headrest body toward and away from the head of the passenger;

a mechanical energy storage device having a spring acting upon the head-engaging member, stressable upon movement of the head-engaging member toward the main headrest body, and upon energy relief displacing the head-engaging member toward the head of the passenger in an outward movement;

at least one guide part having mounted on the main headrest body having at least one linear guide surface for the head-engaging member;

a return-travel lock mounted on the main headrest body for preventing unintentional inward movement of the head-engaging member (13) toward a starting position;

a releasable coupling device on the main headrest body for securing the head-engaging member in the starting position, the guide part being an elongated cylindrical member, the head-engaging member being mounted upon a slide positively guided on the elongated cylindrical member, the spring extending along the elongated cylindrical member and being braced between the slide and a spring seat on the main headrest body, the return-travel lock includes a locking tooth on the slide engageable with at least one countertooth (Z) at an upper portion of an outward travel stroke (S) of the slide to releasably lock the slide and the head-engaging member against travel opposite the outward travel stroke, and the releasable coupling device has a primary coupling element on the slide engageable with a secondary coupling element on the main headrest body.

According to the invention, therefore, the slide can have two slide portions, each of which is guided along one of the circularly cylindrical guide parts and the spring surrounding each guide part can be braced between that slide portion and the base. Each slide part can have a tooth which is biased by a spring wire toward tooth guide elements. A releasable return travel lock is formed by the teeth and the releasable coupling device can serve to releasably retain the slide in its starting or rest position. The primary coupling element of this device can pull out of the secondary coupling element if desired.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
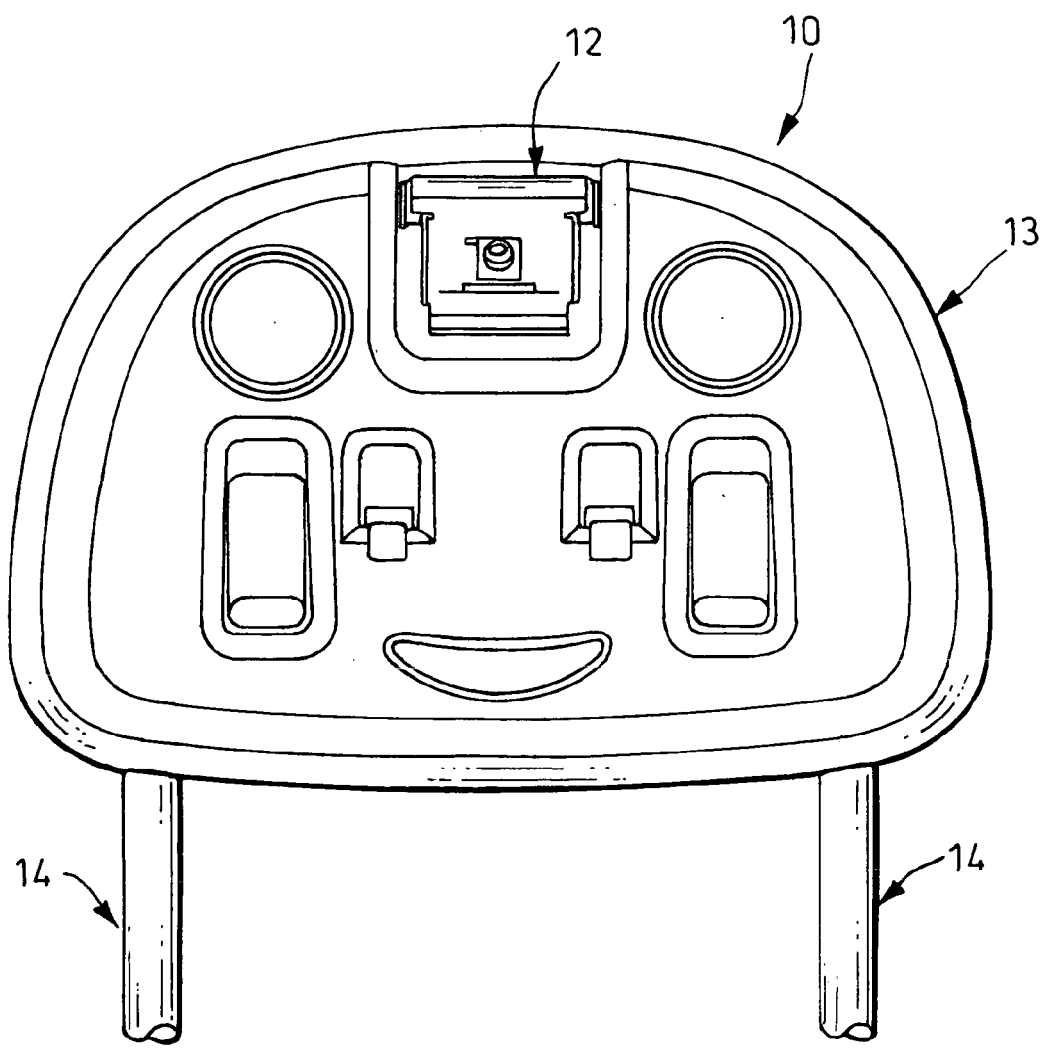
FIG. 1 is a front elevational view of the head-engaging member of a headrest for a motor vehicle seat according to the invention with the front cushion which bears upon the back of the head of the passenger in the passenger seat removed.

The drawing shows a headrest 10 for a seat of a motor vehicle. The headrest 10 comprises a main headrest body 11 (FIG. 2) carrying a head-engaging member 13 which is mounted via a clamping bearing shell 12 upon an actuating mechanism shown diagrammatically in FIG. 3 and structurally in FIGS. 4 and 5. The shell 12 allows adjustment of the inclination of the head-engaging member 13 relative to the mechanism upon which it is mounted.

On the main headrest body 11 there is a stirrup-shaped member 16, also referred to herein as a support bar stirrup, having two ends 14 which are fitted into the back rest of the vehicle seat and which can have notches 15 (FIG. 2) enabling the height adjustment of the headrest as is standard in motor vehicle headrests.

In the back plate 17 of the main headrest body 11, the crash-active part or assembly 18 of the headrest is mounted as a unit. That unit 18 is shown outside of the main body in, for example, FIGS. 5 and 6. The crash-active part 18 is likewise referred to as an actuator for the head-engaging member 13.

The actuator or assembly 18 has a base 19 on which two straight tubular guide parts 20 of circularly cylindrical cross section are mounted at their respective feet 21 (FIGS. 5 and 6) each guide part 20 bears with its foot 21 on the base 19 and via the base 19 on the main headrest body 11 and forms a component which is upstanding therefrom. The feet 21 of the guide part 20 are swingable with the latter about a pivot axis A which is horizontal (FIG. 5) and perpendicular to the longitudinal axis L of each guide part 20.

Each guide part 20 is surrounded by a compression coil spring 22 coaxially (FIGS. 4 and 5), the spring forming forced (or energy) storage devices biasing the head-engaging member 13 away from the base 19 and the main headrest body 11.

The slide 23 has a portion slidable upon each guide part 20. The portions of the slide 23 are connected by a bridge 24. The bridge 24 (FIGS. 4–6) has an axle-forming portion 25 about which the aforementioned clamping bearing shell 12 can be angularly adjusted to vary the angle of inclination at which the head-engaging member is affixed thereto.

Figure 5:
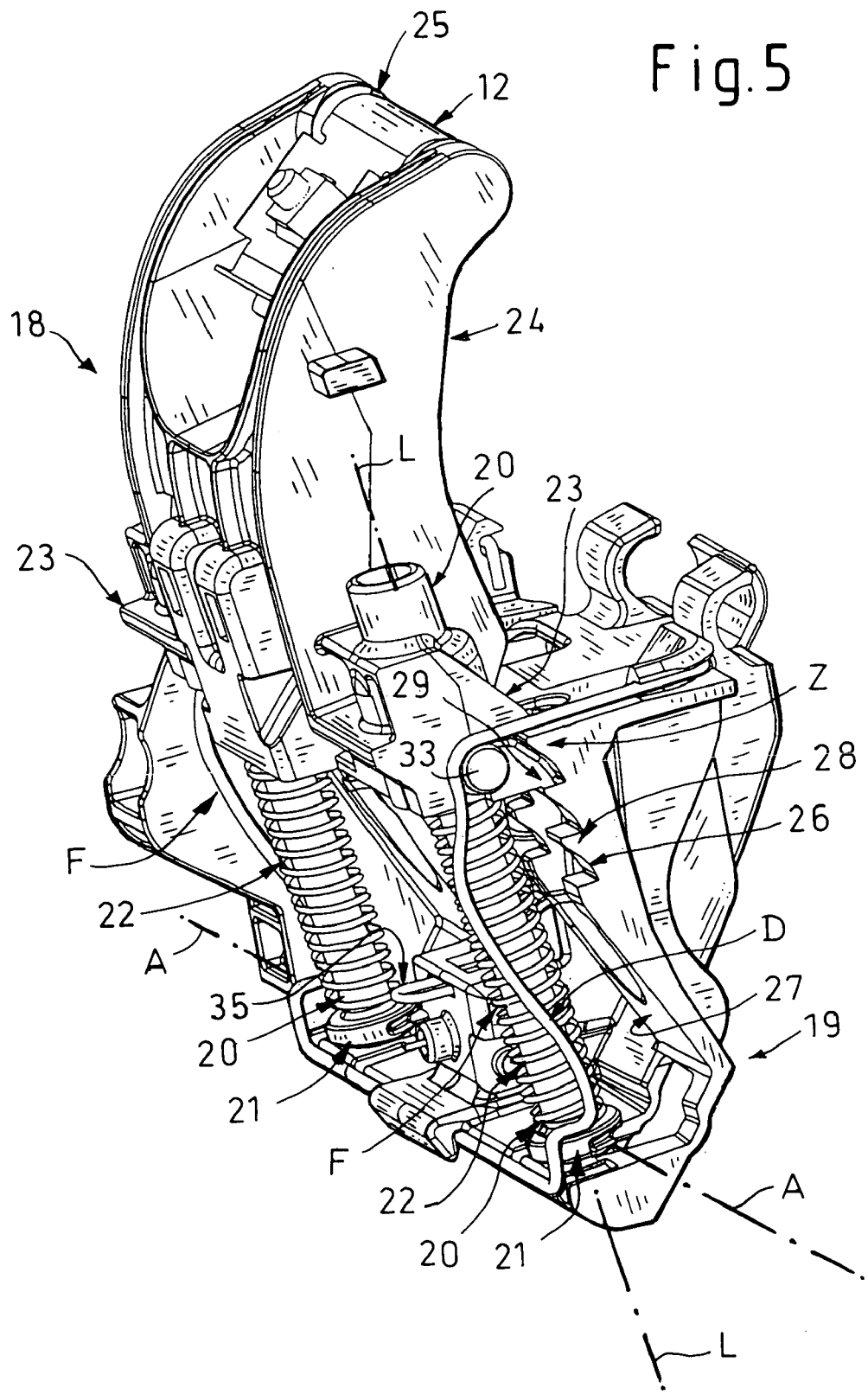
FIG. 5 is a perspective view of the activation mechanism of FIG. 4 shown as an isolated component, separately from the main headrest body and the head-engaging member and at the end of the outward travel stroke.
Figure 6:
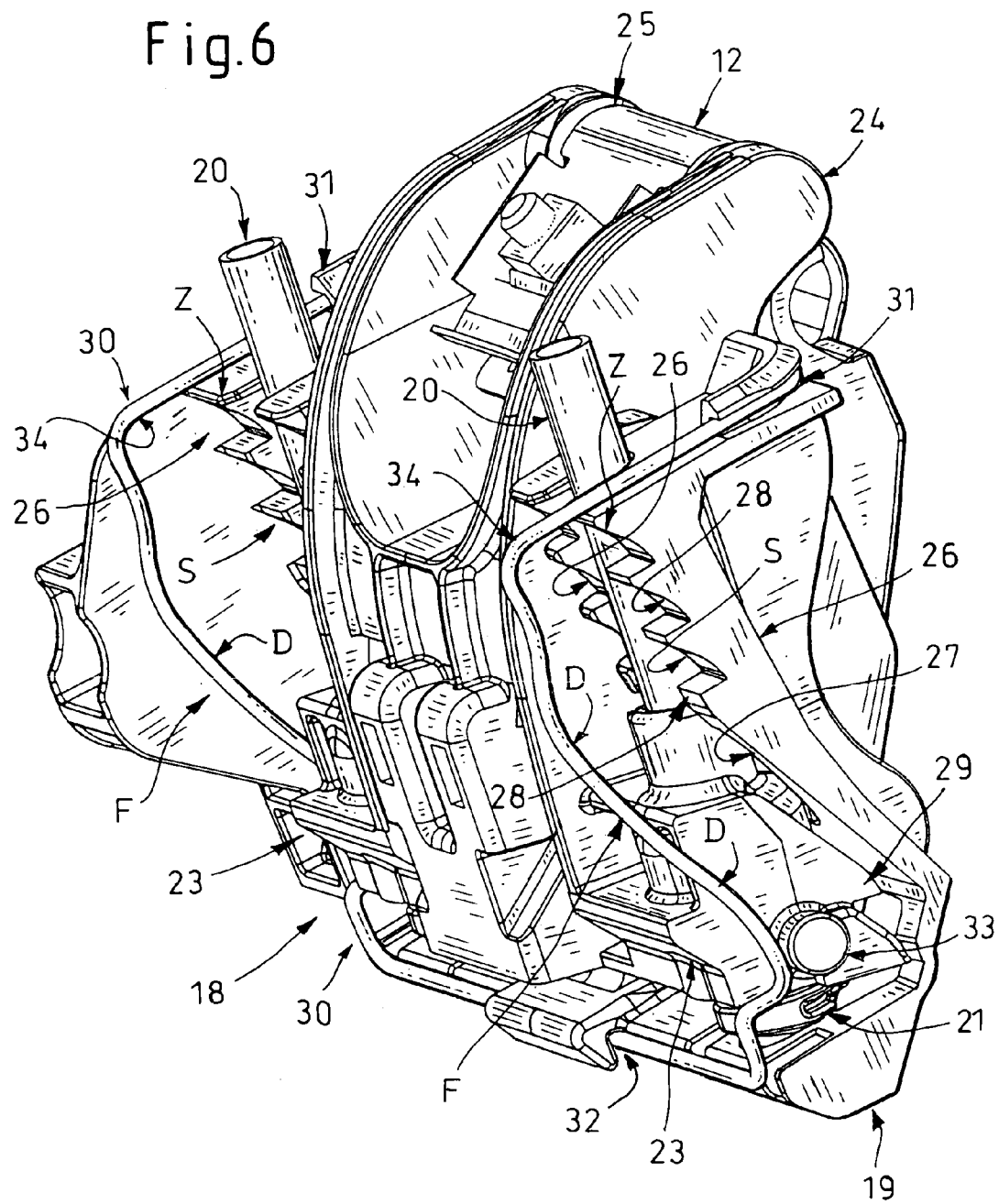
FIG. 6 shows the unit of FIG. 5 in its starting or rest position prior to the beginning of the outward travel stroke.

On opposite sides of the bridge 24 and at each guide part 20, a respective control element 26 is provided to define a control path or track S (FIG. 6). Each control element 26 has as its path-starting end at the level of the respective foot of the associated guide part 20 an initially forwardly and downwardly diverging camming surface 27 (FIGS. 5 and 6). The starting surface 27 is followed by a plurality of intermediate counter-locking teeth 28, of which the uppermost counter-locking tooth has been indicated at Z (FIG. 5).

With the control path S locking tooth 29 on each of the slide portions 23 can cooperate as will be described in greater detail. Each slide part 23 can cooperate with the associated guide element 26 via two such locking teeth 29. While only one of these teeth is visible in FIG. 6, it will be apparent that the tooth tracks of each member 26 straddle the respective guide part 20 and cooperate with teeth 29 which also straddle the respective member 20.

Each slide part 23 is held by a restoring force of a spring against the respective guide track S of the associated control element 26. This restoring force is produced by a stirrup-shaped spring wire 30 which has its upper ends looped around the bridge 24 at 31 and its lower end forming a loop in a plane perpendicular to the upper loop and engaged in the base 19. The spring region has been shown at F in FIGS. 5 and 6.

Each slide part 23 contacts the respective pressure side D of the spring region F of the stirrup-shaped spring wire 30 with a slide body or guide roller 33 (FIGS. 5 and 6).

The stirrup spring 30 has at the upper end of each spring region F a rectangular bend 34 (FIG. 4) which, when the slide 23 has reached its upper position, creates a stop limiting upward displacement of the slide.

Figure 2:
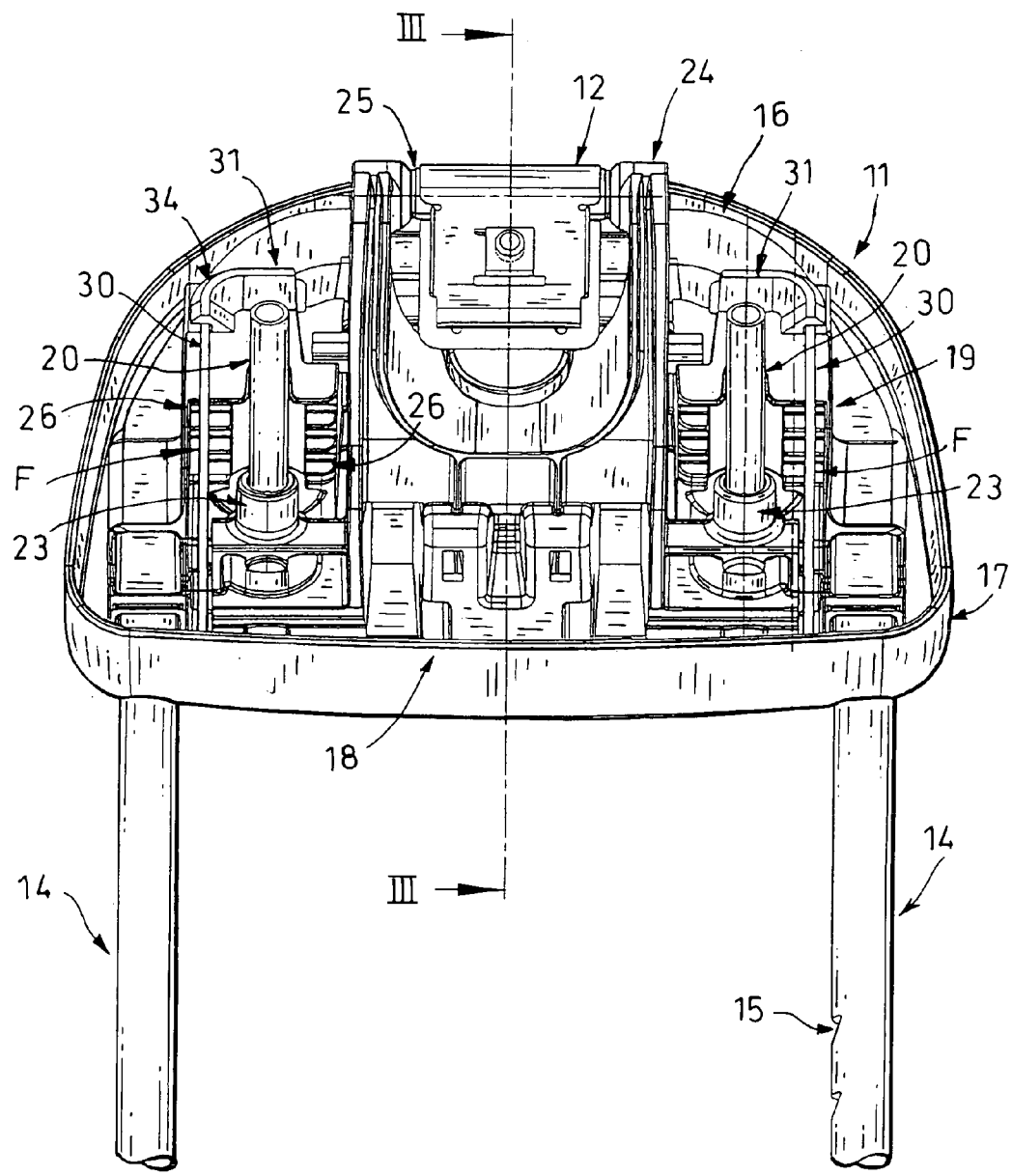
FIG. 2 is a view similar to FIG. 1 after the head-engaging member has been removed showing the mechanism supporting and guiding the head-engaging member in a front elevational view.
Figure 3:
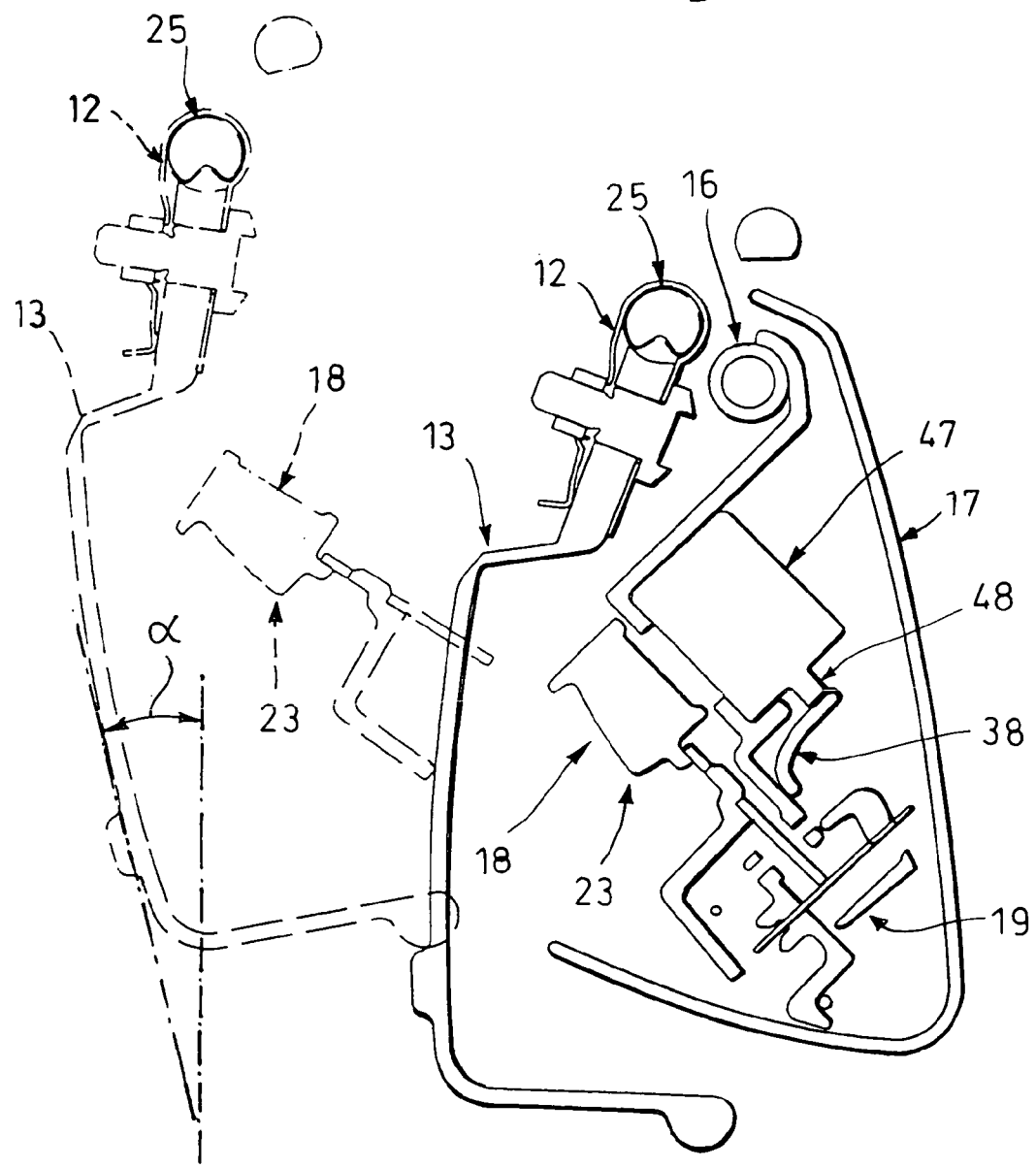
FIG. 3 is a highly diagrammatic cross sectional view taken along the line III—III in FIG. 2 and showing the mechanism in its starting position in solid lines and at the end of the outward travel stroke in broken lines.
Figure 7:
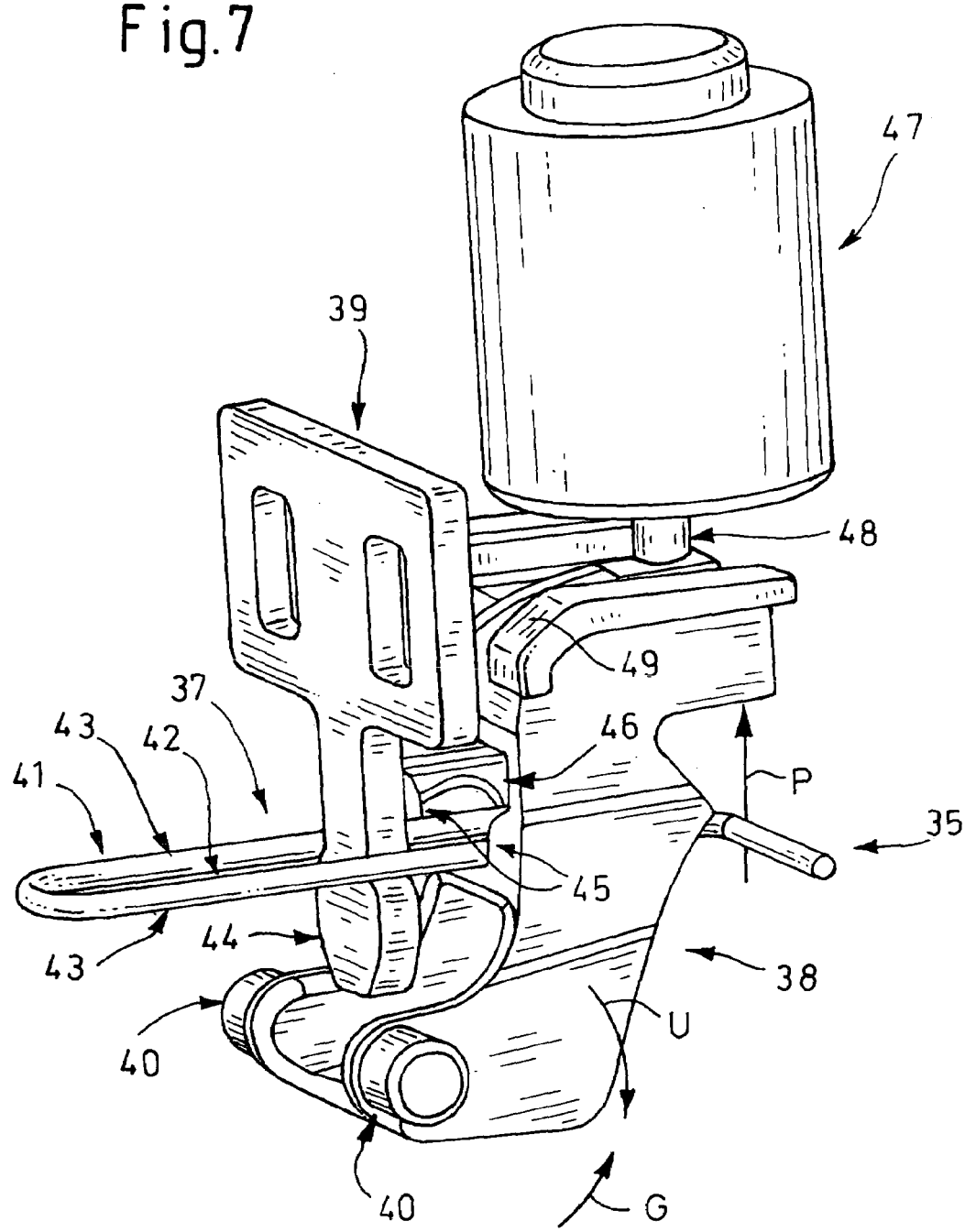
FIG. 7 is a perspective view of the releasable coupling device shown in its locked position.

Each slide part 23 has a releasable coupling device 35 which can retain the slide 23 in its starting or rest position (see FIG. 2, FIG. 3 right, FIG. 6 and FIG. 7). The coupling device 35 can have various constructions and configurations of which the illustrated embodiment is only one example.

Figure 4:
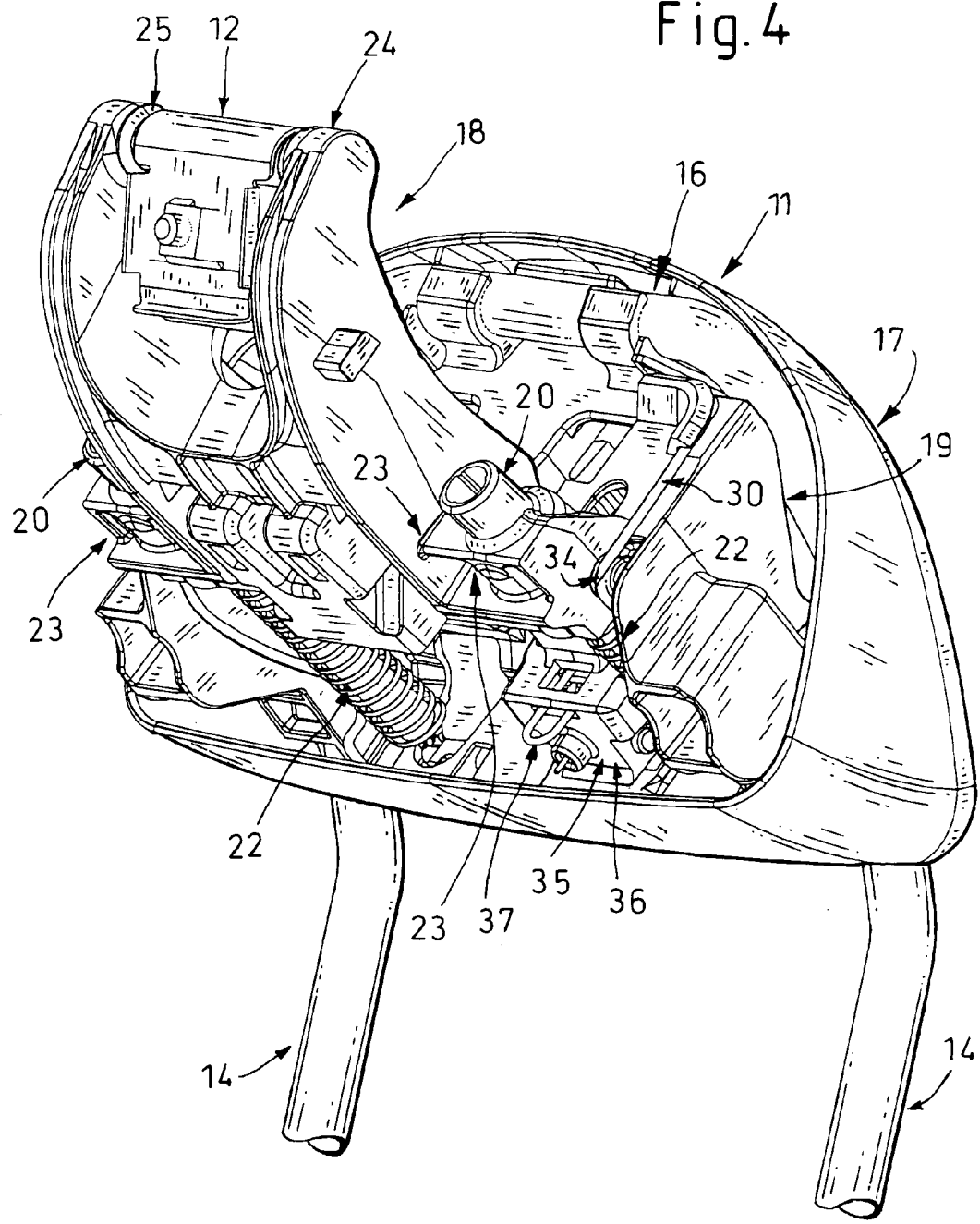
FIG. 4 is a perspective view of the supporting mechanism of FIG. 2 in its activated position by contrast with the position shown in FIG. 2, namely the rest or starting position.

In FIG. 4 only one of the releasable coupling devices 35 is visible. The coupling devices 35 can have a receiving part 36 fastened on the base (FIG. 4) to hold a spring wire 37 curved in the configuration of a hairpin.

Figure 8:
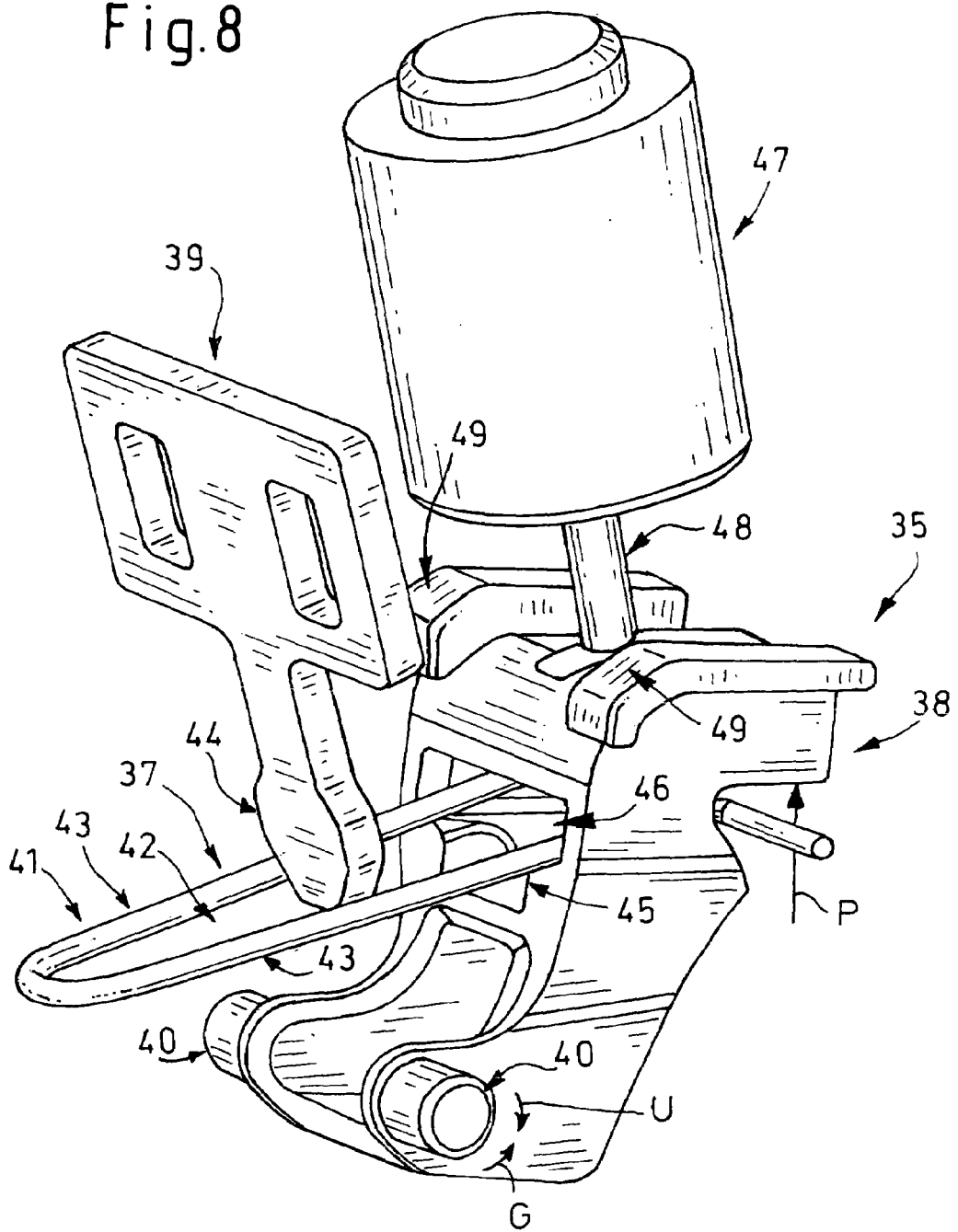
FIG. 8 is a perspective view of that coupling device in its released position.

The coupling devices 35 have been illustrated in FIGS. 7 and 8 without the receiving part 35 and, as shown in these Figures, each have a switching rocker 38 and a coupling pin 39 fastened on the respective part 23 of the slide. The coupling pin 39 has been referred to herein as the primary coupling element of the releasable coupling device 35 and is engageable with the secondary coupling element in the form of member 37.

The switching rocker 38 is pivotally mounted in the base 19 by a pair of pivot pins 40. In the base body 19, by means of the receiving part 36 and the hairpin bent region 41, the coupling spring wire 37 is held, i.e. stressed.

In the illustration of FIG. 7, the gap 42 between the shanks 43 of the spring wire 37 has its smallest width so that the key shape enlargement 44 of the coupling pin 39 is arrested at its neck or narrow region together with the associated slide part 23. The spring wire 37 is so configured that, upon relief of the stored force, the gap 42 is widened. In the locked position of the coupling device 35 as shown in FIG. 7, the two shanks 3 are located between two diametrically opposite clamping jaws 45 of the rocker 38.

In the case in which the rocker is swung in the clockwise sense U downwardly, the wire shanks 43 pass into the wider space 46 (FIGS. 7 and 8) of the rocker 38. The gap 42 widens the coupling 35 passes into its released position and the slide 23 is free to move upwardly with its coupling pins 39.

The rocker 38 is biased by the restoring force P of a further spring (not shown) continuously in the counterclockwise sense. The spring-restoring force P is greater than the outward bias by any spring force of the coupling spring wire 37. As a result, the rocker 38 continuously tends to swing in the direction in which shanks 43 of the wire 37 are pressed between the clamping jaws 35 and thus define the narrower gap width of the gap 42 between the shanks. In the case of a crash, an electromagnet 47 (FIG. 3) fastened on the base 19 receives a signal to drive the pin 48 (FIG. 8) downwardly and cause the rocker 38 to pivot in the clockwise sense against the spring-restoring force P downwardly. As a consequence the shanks 43 spring into the larger space 46 of the rocker 38. The gap 42 widens to liberate the coupling pin 39 to enable the slide 23 to move upwardly by expansion of the coil springs 42.

The locking teeth 29 on the slide 23 initially slide along the ramps 27 of the respective guide tracks S and are held by the spring force in the region F against the guide tracks S. The locking teeth 29 jump over the counterteeth 28 until the uppermost countertooth Z is reached at which the slide 23 is held (see FIG. 5).

FIG. 3 shows schematically in the broken line view the position of the head-engaging member 13 in the fully expanded position of the springs 22 and in the solid line position, the location of the head-engaging member when the springs 22 are fully compressed. The comparison of the broken lines with the solid line position also shows the angular shift in the head-engaging member as a result of that displacement, i.e. through an angle a which may be about 10° as the members 29 ride along the track S.

For the case in which the head-engaging member 13 contacts the head of the passenger relatively early, the travel of the slide 23 will terminate in the region of one of the intermediate teeth 28.

From the outward travel positions it is possible simply by hand to press the head-engaging member 13 back into its starting or rest position. In that case, the head-engaging member 13 can be drawn forwardly to pull the spring wire 30 away from the tracks S and allow the teeth 29 to move downwardly. The bridge piece 24 is likewise drawn forwardly and permits the slide 23 to move forwardly against the restoring force of the spring region F and pivot about the axis A in the forward direction. The slide is then moved downwardly into its starting position. The coupling pin 39 is swung in the clockwise sense against the inclined surface 29 of the rocker so that the rocker pivots in the clockwise sense and the shanks 43 can spread in the space 46. This allows the pin 39 to pass through the gap 42 without obstruction and, upon further pivoting of the rocker 38 under the effect of the restoring force P to pivot in the counterclockwise sense and allow the shanks to retain the coupling pin 39.

We claim:

1. A headrest for a motor-vehicle seat, the headrest comprising:
    a main headrest body adapted to be mounted on a back of the seat;
    a cylinder extending along an axis and mounted on the main headrest body;
    a slide displaceable in a straight line axially along the cylinder;
    a head-engaging member carried on the slide and having a surface juxtaposable with a back of a head of a passenger in the seat, the head-engaging member and slide being jointly displaceable along the cylinder between an outer activated position and an inner rest position;
    a spring extending along the cylinder and braced between the slide and the main headrest body and urging the slide and head-engaging member outward into the outer activated position;
    return-lock means including
        a locking tooth on the slide, and
        a countertooth on the main headrest body engageable with the locking tooth after outward displacement of the slide toward the outer position from the inner position for preventing displacement of the slide and head-engaging member inward toward the inner rest position;
    releasable-coupling means including
        a primary element on the slide, and
        a secondary element on the main headrest body engageable with the primary element for releasably retaining the slide in the rest position, whereby, when the releasable-coupling means releases the slide, the slide moves outward in a straight line toward the outer position and the return-lock means inhibits inward movement back toward the inner position; and
    a control element extending along the cylinder and defining a control track cooperating and engageable with the locking tooth and carrying the countertooth.

2. The headrest defined in claim 1 wherein the cylinder axis extends upwardly at an inclination to the vertical.

3. The headrest defined in claim 1 wherein the cylinder is a tube of circular cross section.

4. The headrest defined in claim 1 wherein the spring is a cylindrical coil compression spring coaxially surrounding the cylinder.

5. The headrest defined in claim 1 wherein flanks of the countertooth face forward in a direction of the head of the passenger.

6. The headrest defined in claim 1, further comprising a second locking tooth and a second control element, the two locking teeth flanking the cylinder and cooperating with the control elements.

7. The headrest defined in claim 6 wherein two such cylinders are provided and said slide has respective portions displaceable along the respective cylinders and a bridge between said slide portions.

8. The headrest defined in claim 7 wherein said bridge carries said head-engaging member.

9. The headrest defined in claim 8, further comprising an angularly adjustable member between said bridge and said head-engaging member.

10. The headrest defined in claim 9 wherein said angularly adjustable member is pivotal on said bridge.

11. The headrest defined in claim 10 wherein said angularly adjustable member is a clamping bearing shell engaging over a pin on said bridge.

12. The headrest defined in claim 1, further comprising a spring element pressing said slide toward said control element.

13. The headrest defined in claim 12 wherein said spring element is a stirrup-shaped spring wire.

14. The headrest defined in claim 13 wherein said slide has slide parts each slidable against said spring wire for contacting same with a respective roller.

15. The headrest defined in claim 14 wherein said spring element limits outward displacement of said slide.

16. A headrest for a motor-vehicle seat, the headrest comprising:
    a main headrest body adapted to be mounted on a back of the seat;

a cylinder extending along an axis and mounted on the main headrest body;

a slide displaceable in a straight line axially along the cylinder;

a head-engaging member carried on the slide and having a surface juxtaposable with a back of a head of a passenger in the seat, the head-engaging member and slide being jointly displaceable along the cylinder between an outer activated position and an inner rest position;

a spring extending along the cylinder and braced between the slide and the main headrest body and urging the slide and head-engaging member outward into the outer activated position;

return-lock means including
  a locking tooth on the slide, and
  a countertooth on the main headrest body engageable with the locking tooth after outward displacement of the slide toward the outer position from the inner position for preventing displacement of the slide and head-engaging member inward toward the inner rest position; and releasable-coupling means including
  a primary element on the slide, and
  a secondary element on the main headrest body engageable with the primary element for releasably retaining the slide in the rest position, whereby, when the releasable-coupling means releases the slide, the slide moves outward in a straight line toward the outer position and the return-lock means inhibits inward movement back toward the inner position, the cylinder being mounted by a pivot on said main headrest body.

17. The headrest defined in claim 16 wherein the cylinder has a foot pivotable about a horizontal pivot axis perpendicular to the cylinder axis.

18. A headrest for a motor-vehicle seat, the headrest comprising:

a main headrest body adapted to be mounted on a back of the seat;

a cylinder extending along an axis and mounted on the main headrest body;

a slide displaceable in a straight line axially along the cylinder;

a head-engaging member carried on the slide and having a surface juxtaposable with a back of a head of a passenger in the seat, the head-engaging member and slide being jointly displaceable along the cylinder between an outer activated position and an inner rest position;

a spring extending along the cylinder and braced between the slide and the main headrest body and urging the slide and head-engaging member outward into the outer activated position;

return-lock means including
  a locking tooth on the slide, and
  a countertooth on the main headrest body engageable with the locking tooth after outward displacement of the slide toward the outer position from the inner position for preventing displacement of the slide and head-engaging member inward toward the inner rest position; and releasable-coupling means including
  a coupling pin fixed to the slide, and
  a coupling spring wire having a hairpin configuration on the main headrest body engageable around the coupling pin for releasably retaining the slide in the rest position, the coupling pin being retained in the coupling spring wire in a narrowed position thereof and released therefrom in a spread position thereof, whereby, when the releasable-coupling means releases the slide by spreading of the coupling spring wire, the slide moves outward in a straight line toward the outer position and the return-lock means inhibits inward movement back toward the inner position.

19. The headrest defined in claim 18 wherein said releasable coupling means includes a switching rocker biased by a spring force in a closing direction and displaceable against said spring force into an open position.

20. The headrest defined in claim 19 wherein said slide has a camming surface enabling displacement of said rocker to cause said pin to pass into said spring element upon inward displacement of the slide.

21. The headrest defined in claim 20 wherein the rocker is actuated by a pin of an electromagnetic driver.

22. The headrest defined in claim 21 wherein said driver is actuatable by a control signal produced by a sensor.

* * * * *